United States Patent [19]

Foulks et al.

[11] 4,351,187
[45] Sep. 28, 1982

[54] SINGLE CUE DRIVE FOR FLIGHT DIRECTOR INDICATOR

[75] Inventors: Alan L. Foulks; Gary O. Larson, both of Phoenix, Ariz.

[73] Assignee: Sperry Corporation, New York, N.Y.

[21] Appl. No.: 187,118

[22] Filed: Sep. 15, 1980

[51] Int. Cl.³ .............................................. G01C 21/00
[52] U.S. Cl. .................................. 73/178 R; 116/289; 340/27 NA
[58] Field of Search ............. 73/178 R, 178 H, 178 T; 116/DIG. 43, 289; 340/27 NA

[56] References Cited

U.S. PATENT DOCUMENTS

| | | | |
|---|---|---|---|
| 2,613,050 | 10/1952 | Esval | 73/178 R |
| 2,696,597 | 12/1954 | Chombard | 73/178 R |
| 3,019,532 | 2/1962 | Haerther et al. | 73/178 R |
| 3,094,971 | 6/1963 | Guarino et al. | 73/178 R |
| 3,691,987 | 9/1972 | Strock | 73/178 R |
| 3,988,927 | 11/1976 | Cox | 116/DIG. 43 |

FOREIGN PATENT DOCUMENTS 898975 6/1962 United Kingdom ............. 73/178 R

*Primary Examiner*—Donald O. Woodiel
*Attorney, Agent, or Firm*—Howard P. Terry

[57] ABSTRACT

The single cue of a pitch and roll flight director command indicator is driven by a mechanism having a pitch servomotor pivotally mounted in the flight director housing for rotation about the roll axis and a roll servomotor fixed to the housing for rotating the pitch servomotor about the roll axis. The single cue is connected to an arm which is pivotally mounted on the pitch motor for rotation about the pitch axis whereby the single cue may be simultaneously positioned in pitch and roll by said servomotors to provide visual commands for bringing the craft to a predetermined flight path of attitude.

11 Claims, 5 Drawing Figures

SINGLE CUE DRIVE FOR FLIGHT DIRECTOR INDICATOR

BACKGROUND OF THE INVENTION

1. Field of the Invention

This invention pertains to indicating instruments, particularly of the aircraft director type.

2. Description of the Prior Art

Aircraft flight director instruments are known that provide visual commands to the pilot indicating the control required to bring the craft to a predetermined flight path or attitude. A flight director instrument commonly utilized is the single cue type shown and described in U.S. Pat. No. 3,691,987, entitled "Indicator Mechanism for Navigation Instruments", by R. Strock, and assigned to the applications' assignee.

The single cue type of flight director indicator permits the utilization of a single indicating element that displays pitch and roll command motions that are realistically suggestive of the aircraft control required of the pilot in response to the visual commands. The single cue flight director of said U.S. Pat. No. 3,691,987 includes a drive mechanism having a first and second gear members mounted for rotation with respect to each other and with respect to the instrument housing. Drive means or servomotors are included for rotating the first and second gear members in the same direction and at the same angular velocity with respect to each other relative to the housing in response to a roll command signal and for rotating the members in opposition to each other in response to a pitch command signal. An indicator element is coupled to the first and second gear members so that a first motion is imparted thereto about the roll axis of the instrument when the first and second gear members rotate in the same direction and at the same angular velocity and a second motion is imparted thereto about the pitch axis of the instrument when one of the members rotates in opposition to the other.

An alternative prior art single cue type of flight director, described in the aforementioned Strock patent, may be realized by incorporating a platform in the instrument, the platform being mounted for rotation about the roll axis thereof. A meter movement which may be of the type disclosed in U.S. Pat. No. 3,577,195, and assigned to the applicants' assignee, or a servomechanism mounted on the platform provides pitch motions to an indicator element that is connected thereto. It is thus appreciated that visual roll commands are provided by rotating the platform, hence imparting roll motions to the indicator element. Energization of the meter movement or servomechanism mounted on the platform imparts the required pitch motions to the indicator. This prior art arrangement requires a large diameter swing circle for the platform as well as a counterweight for the meter movement or servomechanism, to reduce the power requirements of the roll servomotor, thereby increasing the dimensions required to house the instrument.

Accordingly, the practice of the aforementioned single cue flight directors require either a considerable number of gears or relatively heavy counterweights that require a large swing circle. For example, the drive mechanism of the flight director indicator disclosed in U.S. Pat. No. 3,691,987 requires a large number of spur gears, two ring gears and one mechanical differential. Moreover, the flight director indicator of the type having a relatively heavy servomechanism or meter movement, which applies a relatively large torque about the roll axis, would have its response and accuracy adversely affected by the torque if it were not for the counterweights. The required counterweights, precision gearing and mechanical differential of the prior art, increase both the weight and the cost of the flight director instrument. Since a decrease in weight, mechanical complexity as well as costs is especially desirable in aircraft flight instruments, it is particularly undesirable in such an environment to utilize devices having a considerable number of gears or counterweights. Accordingly, there is a desire and a need for a single cue flight director instrument having a reliable, compact and relatively inexpensive cue drive mechanism.

SUMMARY OF THE INVENTION

A flight director indicator of the type having a single command cue includes a drive mechanism for displacing the cue in response to both pitch and roll commands. The indicator cue is coupled to an arm which provides a fine adjustment such that it may be disposed in front of an attitude indicating member and precisely aligned with a fixed reference or zero command member. The arm is coupled to second drive means or pitch servomotor having a gear train comprised of a worm gear assembly such that the arm and the indicating element may be displaced in substantially vertical or pitch directions. The second drive means also includes a rotatably mounted base plate having a sector gear which is coupled to a first drive means or roll servomotor mounted parallel to the second drive means, and it includes gear means for cooperating with the sector gear, associated with the base plate affixed to the second drive means and disposed at a 90° angle to the first drive means, such that the second drive means, the arm and the indicating element may be displaced in roll. The input signals to the first and the second drive means are provided by a flight director computer, and thus, the pitch and roll displacements of the indicating element provide the pilot with visual commands to bring the aircraft to a predetermined flight path or attitude by responding to the commands to "zero" the cue at the fixed reference position.

BRIEF DESCRIPTION OF THE DRAWINGS

FIG. 1a is an illustration of the fine adjustment means included on the arm of the single cue drive mechanism illustrated in FIG. 1;

FIG. 2 is a side view and schematic illustration of the pitch servomotor utilized in the drive mechanism of FIG. 1, and it should be noted that the roll servomotor is similar;

FIG. 2a is a front view of the pitch servomotor of FIG. 2 and an illustration of the cue drive worm gear means.

DESCRIPTION OF THE PREFERRED EMBODIMENT

Figure 1:
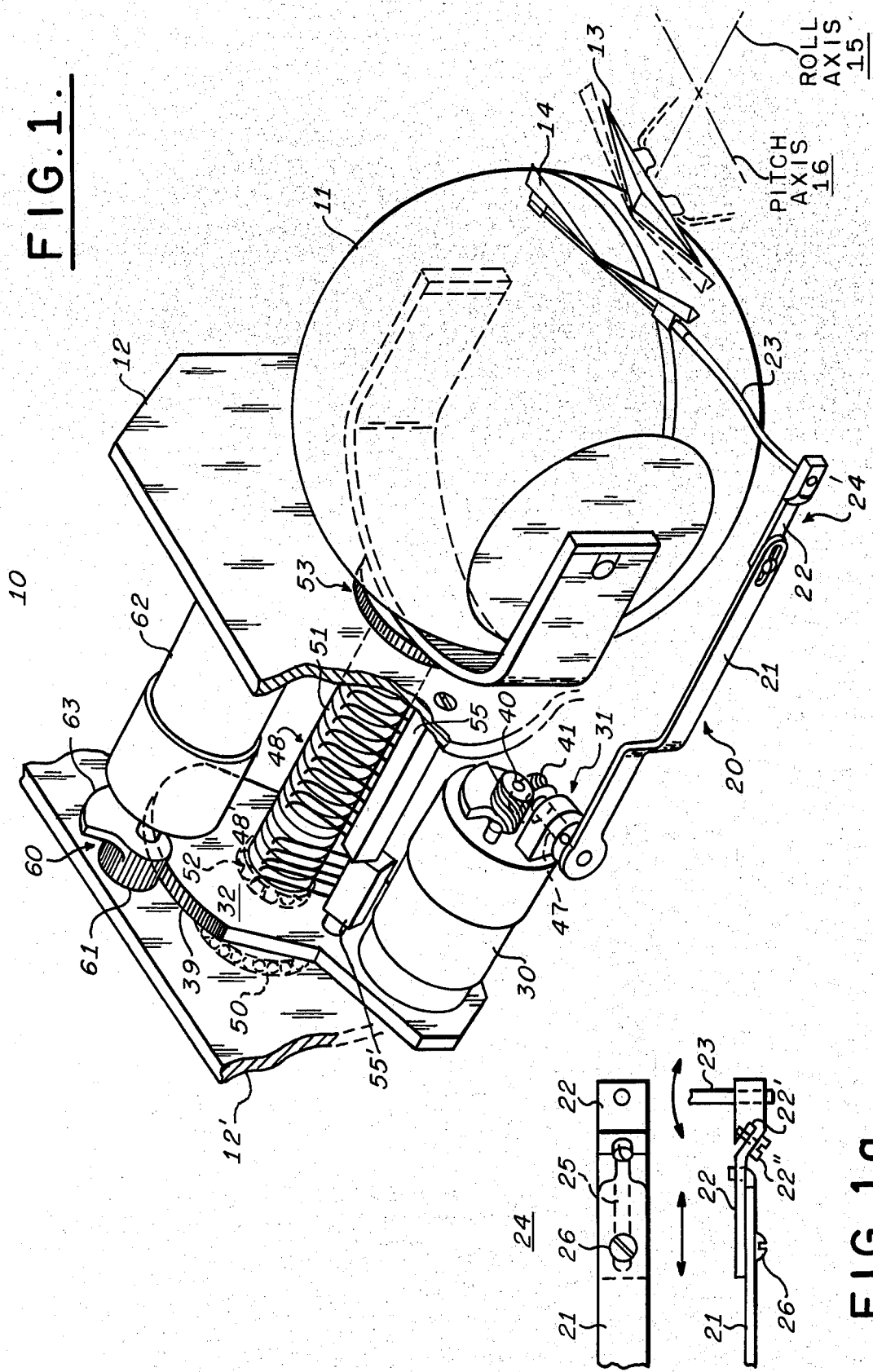
FIG. 1 is a schematic illustration of a preferred embodiment of the present invention.

Referring to FIG. 1, an illustration of a portion of a single cue, flight director instrument 10 of the attitude sphere type and incorporating a preferred embodiment of the cue drive mechanism of the present invention is provided. The instrument 10 includes an attitude indicating member, for example, an attitude sphere 11, and fixed support walls 12, 12' of the instrument housing (not shown) in the general manner described in U.S. Pat. No. 2,782,395 assigned to the applicants' assignee. A fixed or zero index 13, affixed to the housing wall 12 and disposed for view near the center of the instrument face, is used for a zero command reference for the indicator cue 14 of the present invention in a manner to be explained and as a zero pitch and roll reference for the attitude sphere 11.

Figures 2, 2A:
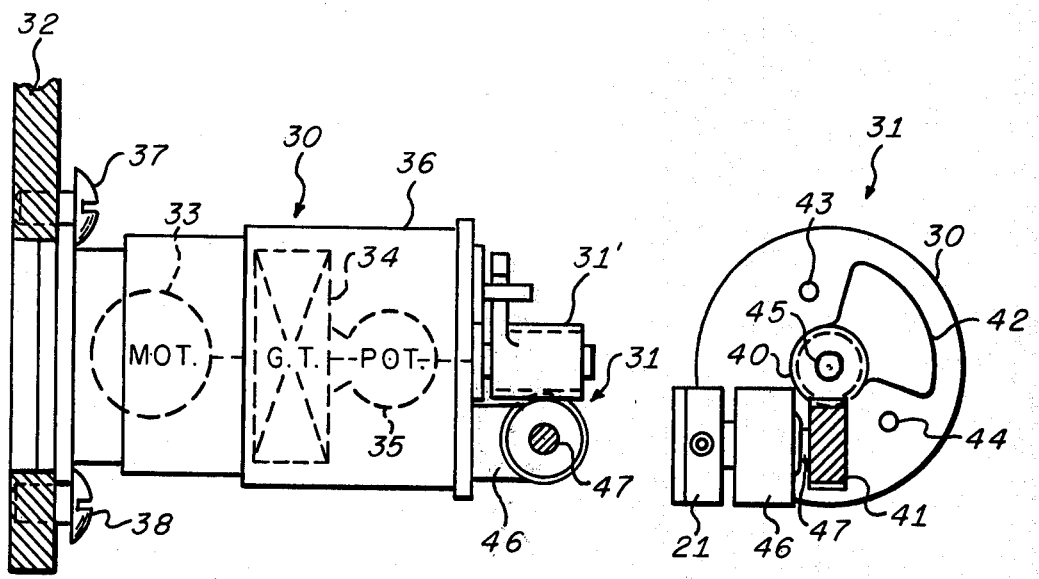

A longitudinal axis 15 of the instrument 10 is preferably disposed parallel to the roll or x-axis of the aircraft and will be referred to as the roll axis of the instrument. A lateral axis 16, perpendicular to the axis 15, is preferably disposed parallel to the aircraft athwartships or y-axis and will be referred to as the pitch axis of the instrument. The indicator mechanism of the present invention includes an indicating element or cue 14 disposed for view in front of the attitude sphere 11. The cue 14 is connected to the free end of an elongated arm means 20. Arm means 20 includes members 21, 22, and 23 which when rigidly connected together support the indicator cue 14 and provide the fine cue adjustment means 24, hereinafter described in greater detail. The arm means 20 is coupled to second drive means or pitch servomotor 30 via worm gear means 31, hereinafter also described in greater detail. The pitch servomotor 30 is affixed (as illustrated in FIG. 2) to a base plate or gear sector 32 which is rotatably supported or journalled by ball bearings 50 in an aperture in the housing wall 12' (see FIG. 3). One end of shaft 51 is supported and journalled in ball bearings 52 disposed within an aperture in the gear sector 32; the other end of the shaft 51 is supported and journalled in ball bearings 53 disposed within an aperture of the housing wall 12. The shaft 51 serves to support a gimbal 54 which in turn supports and provides for the universal rotation of the attitude sphere 11 about the pitch and roll axes 16, 15 in a conventional fashion. The gear sector 32 is aligned and meshes with gear means 60 which is driven by a first drive means or roll servomotor 62. The roll servomotor 62 is mounted on the housing wall 12 and includes a mechanical stop means 63 for limiting the rotation of gear 60 between predetermined limits. The roll servomotor 62 is disposed parallel to the roll axis 15 for providing a simple spur gear mesh gear sector 32. A two section brush block means 55, 55' is provided, one block 55 being mounted on the housing wall 12 and the other 55' being mounted on the gear sector 32 for rotation therewith. The brush block means cooperates with conventional slip rings 48 mounted on the shaft 51 to transmit electrical signals across the rotary joint formed by the shaft 51, the housing wall 12, and the gear sector 32. Thus, two primary electrical signals provided by the instrument electronics are transmitted by the slip ring means; pitch attitude signals are for positioning the sphere 11 about axis 16 and flight director pitch command signals are for positioning the single cue indicator 14 by operation of flight director pitch motor 30.

Referring now to FIG. 1a, an enlarged illustration of the fine cue adjustment means 24 is provided. The fine cue adjustment means 24 provides for the exact calibration or alignment of the indicating element 14 with the index 13. At the junction of support arm members 21, 22, a slot 25 is formed, and an adjustment screw 26 allows for the precise longitudinal positioning of member 22 relative to member 21 and hence precise longitudinal positioning of cue 14 relative to index 13. The indicating element 14 may also be further calibrated by positioning member 23 through an adjustment of screw 22" in slot 22'. This will permit angular positioning of cue 14 members so that they may be precisely aligned laterally with the lateral edges of reference 13.

Referring now to FIG. 2, the pitch servomotor 30 is illustrated in a schematic representation with its active elements overlayed thereon. The pitch servo is a small, compact, lightweight unit comprising a d.c. electric motor 33, a reduction gear train 34, and a potentiometer 35 all enclosed in a unitary housing 36. The potentiometer 35 provides a feedback signal necessary to form a closed-loop positioning servo in a manner well known in the art. The unit 36 is clamped to the gear sector 32 by screws 37 and 38 so that it extends parallel with the gimbal trunnion 51 and is closely and radially spaced therefrom. The worm gear means 31 is directly supported on the end of the pitch servo 30 and provides the support and motive power for the cue arm 20. It should be noted that the roll servo 62 is substantially identical to the pitch servo 30 except that roll servo 62 output is a simple spur gear.

Referring now to FIG. 2a, an end view of the pitch servo 30 and its worm gear means 31 and limit stop mechanism 42 is provided. The limit stop mechanism 42 and a helical gear 40 comprise a single moulded element mounted upon an output shaft 45 of the pitch servomotor 30. The mechanical stop 42 limits the rotation of the servomotor output shaft 45 between predetermined limits by abutting pins 43, 44. In accordance with the present invention the single cue 14 and its driving arm 20 are supported on and driven by the pitch servomotor 30. This is accomplished by securing or moulding directly in the end surface of pitch servo 30 a bushing block 46 having a substantial thickness. Block 46 is drilled out to receive short shaft 47, preferably in ball bearings. One end of shaft 47 is fixed to the worm wheel 41 which meshes with helical gear 40, and the other end of which is pinned to the hub 21 on the support end of arm 20. Thus, the arm 20 is positioned directly by the pitch servo 30 and indirectly by the roll servo 62 through sector gear 32.

Figure 3:
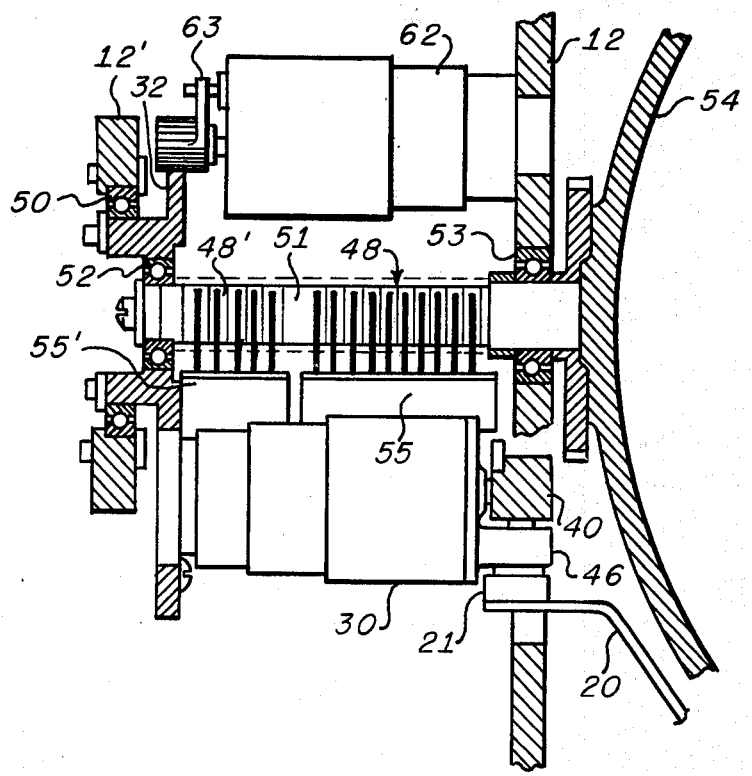
FIG. 3 is a partial top view of the drive mechanism of FIG. 1.

Referring now to FIG. 3, a plan view of a portion of mechanism illustrated isometrically in FIG. 1 provides a more detailed showing of the elements, particularly the slip ring arrangement and further illustrates the compactness of the design. The shaft 51 includes two sets of slip rings 48 and 48' which are aligned and cooperate with the respective brush block means 55 and 55'. The brush block 55 is fixed on the housing wall 12 and brush block 55' is mounted on and rotatable with the gear sector 32. The slip rings 48 and 48' are conventionally separated by non-conductive washers and form channels for retaining the brushes in contact therewith. Thus, electrical flight director command signals are provided to pitch servomotor 30 by internally coupling corresponding slip rings that are aligned with the fixed brush block 55 with slip rings that are aligned with movable brush block 55'. Slip rings 48 which are aligned with the fixed brush block 55 are utilized to provide electrical pitch attitude signals to drive the sphere in accordance with craft pitch attitude in a conventional manner. It should also be noted from FIG. 3 that the roll servomotor 62 includes mechanical limit stop means 63 similar in design to the mechanical stop means 42 associated with the pitch servomotor 30 for limiting cue 14 displacement in roll between predetermined limits.

Referring again to FIG. 1, the operation of the single cue drive mechanism illustrated therein will first be described in terms of a flight director pitch command only. In the absence of a roll command signal from the flight director computer system (not shown), the roll motor 62 is maintained stationary thereby holding stationary the sector gear 32 and the pitch servomotor 30. The pitch command signal from the flight director system energizes the pitch motor 30 through slip rings 48' and brushes 55' and causes the helical gear 40 to rotate which, in turn, causes the worm wheel 41 to rotate and arm 20 to be displaced in a substantially vertical direction through rotation of shaft 47. As the arm 20 is displaced vertically, single cue element 14 is displaced therewith to thereby command a craft pitch maneuver.

The operation of the single cue drive mechanism illustrated in FIG. 1, will now be described in terms of a flight director roll command only. In the absence of a pitch command from the flight director system (not shown) the pitch motor 30 is unenergized and hence no pitch motion of arm 20 occurs. The roll command signal from the flight director system energizes the roll motor 62 causing the spur gear 60 to rotate the gear sector 32 about the roll axis 16 thereby rotating the pitch motor 30 and the arm 20 about the roll axis and a corresponding tilt of the cue 14 relative to the reference 13. Clearly simultaneous energization of the pitch motor 30 and roll motor 62 will cause the indicating element or single cue 14 to be displaced in substantially oblique directions relative to fixed reference 13.

It can now be appreciated that the single cue flight director command element 14 may be caused to execute combined motions relative to the fixed reference 13 in response to roll and pitch command signals from the flight director system which motions are accomplished through relatively simple and inexpensive mechanisms and which are compactly arranged to minimize the sweep volumes required.

While the invention has been described in its preferred embodiments, it is to be understood that the words which have been used are words of description rather than limitation and that changes may be made within the purview of the appended claims without departing from the true scope and spirit of the invention in its broader aspects.

We claim:

1. An indicating instrument for aircraft having a support housing and a single indicator element adapted to be displaced about roll and pitch command axes relative to a reference index in response to roll and pitch command signals comprising,
    a sector gear means supported in said housing for rotation about said roll axis and a roll servomotor supported in said housing having an output for rotating said sector gear about said roll axis in response to said roll signals,
    a pitch servomotor mounted on said sector gear having an output shaft extending therefrom in a direction substantially parallel to said roll axis and radially displaced therefrom and responsive to said pitch signals,
    an elongated arm means supporting said indicator element, and
    means for supporting said arm means on said pitch servomotor for pivotal movement about said pitch axis and including right angle drive means coupled between said output shaft and said arm means.

2. The indicating instrument as set forth in claim 1 wherein at least said pitch servomotor comprises a motor housing including a servomotor, a reduction gear train and a signal generator connected between said gear train and said output shaft.

3. The indicating instrument as set forth in claim 1 further including
    an attitude indicating member cooperative with said reference index and said indicator element,
    elongated trunnion means supporting said attitude indicating element for rotation about said roll axis, and wherein said sector gear provides a common rotatable support for said pitch servomotor and said trunnion means.

4. The indicating instrument as set forth in claim 3 wherein said housing includes
    a pair of spaced supporting walls, said sector gear means and one end of said trunnion means being rotatably supported in one of said walls and the other end thereof is rotatably supported in the other of said walls, wherein
    said roll servomotor is mounted on said other wall and extends between said walls generally parallel with said roll axis, and wherein
    said pitch servomotor is mounted on said sector gear means and extends between said walls generally parallel with said roll axis.

5. The indicating instrument as set forth in claim 4 further includes electrical conductor means for conducting electrical signals to said pitch servomotor comprising
    first electric brush means fixed to said housing,
    second electric brush means fixed to said sector gear means, and
    electrically interconnected slip ring means on said trunnion means in contact with both of said brush means.

6. An indicating instrument, responsive to first and second signals, having a housing and a single indicating element disposed in front of an attitude element, comprises:
    arm means coupled to said indicating element for displacing said indicating element;
    first drive means responsive to said first signal and coupled to said arm means for displacing said arm means and said indicating element in substantially vertical directions, said first drive means includes gear means having a worm gear cooperating with a helical gear for displacing said arm means and said indicating element in substantially vertical directions;
    mounting means, affixed to said first drive means, pivotally mounted to said housing, and having a plurality of gear teeth disposed thereon for allowing the arcuate movement of said second drive means; and
    second drive means responsive to said second signal, coupled to said mounting means and mounted on said housing to said first drive means and at a right angle to said mounting means for displacing said mounting means, said first drive means, and said arm means in arcuate movements, thereby displacing said indicating element in substantially oblique orientation.

7. An apparatus according to claim 6 wherein said mounting means includes a plurality of spur gear teeth disposed thereon.

8. An apparatus according to claim 7 wherein said first drive means includes gear means having spur gear teeth for cooperating with the spur gear teeth of said mounting means and for displacing said mounting means in arcuate movements.

9. An apparatus according to claim 8 wherein said arm means includes means for adjusting the position of said indicating element.

10. An apparatus according to claim 8 wherein said second drive means further includes brush means for the transmission of electrical signals.

11. Apparatus according to claim 10 wherein said first and second drive means include mechanical stop means.

* * * * *